US00RE39937E

(19) United States
(12) Reissued Patent
Coleman

(10) Patent Number: US RE39,937 E
(45) Date of Reissued Patent: Dec. 11, 2007

(54) EXHAUST GAS RECIRCULATION SYSTEM

(75) Inventor: Gerald N. Coleman, Dunlap, IL (US)

(73) Assignee: Caterpillar, Inc., Peoria, IL (US)

(21) Appl. No.: 10/180,458

(22) Filed: Jun. 27, 2002

Related U.S. Patent Documents

Reissue of:
(64) Patent No.: 6,079,395
Issued: Jun. 27, 2000
Appl. No.: 09/163,903
Filed: Sep. 30, 1998

(51) Int. Cl.
*F02M 25/07* (2006.01)

(52) U.S. Cl. ..... 123/568.12; 123/568.21; 123/568.22

(58) Field of Classification Search ..... 123/568.11, 123/568.12, 568.21–568.28, FOR. 124; 60/605.2; 701/108
See application file for complete search history.

(56) References Cited

U.S. PATENT DOCUMENTS 4,134,377 A * 1/1979 Bamsey et al. ..... 123/568.12
4,142,493 A * 3/1979 Schira et al. ..... 123/568.21
4,164,032 A * 8/1979 Nohira et al. ..... 701/108
4,164,206 A * 8/1979 Toelle ..... 123/568.27
4,323,045 A * 4/1982 Yamashita ..... 123/568.12
4,375,800 A * 3/1983 Otsuka et al. ..... 123/698
4,388,909 A * 6/1983 Ogasawara et al. ..... 123/501
4,388,912 A * 6/1983 Kimura et al. ..... 123/568.27
4,455,987 A * 6/1984 Sudbeck et al. ..... 123/568.27
4,461,263 A * 7/1984 Hasegawa ..... 123/480
4,466,416 A * 8/1984 Kawamura ..... 123/378
4,598,684 A * 7/1986 Kato et al. ..... 123/568.22
4,625,702 A * 12/1986 Onishi ..... 123/568.28
4,723,527 A * 2/1988 Panten et al. ..... 123/568.22
4,762,107 A * 8/1988 Schoneck et al. ..... 123/478
5,150,694 A * 9/1992 Currie et al. ..... 123/687
5,203,311 A * 4/1993 Hitomi et al. ..... 123/568.12
5,508,926 A * 4/1996 Wade ..... 701/29
5,601,068 A * 2/1997 Nozaki ..... 123/568.12
5,682,864 A * 11/1997 Shirakawa ..... 123/568.21
5,724,950 A * 3/1998 Shino et al. ..... 123/568.21
5,743,243 A * 4/1998 Yanagihara ..... 123/568.12

FOREIGN PATENT DOCUMENTS

EP 279124 A * 8/1988
JP 63208660 A * 8/1988 ..... 123/FOR. 124
JP 11-200956 * 7/1999

* cited by examiner

*Primary Examiner*—Willis R. Wolfe, Jr.
(74) *Attorney, Agent, or Firm*—Finnegan, Henderson, Farabow, Garrett & Dunner

(57) ABSTRACT

Past exhaust emission control systems have failed to cool the exhaust gas prior to mixing with the intake air. The present exhaust gas recirculation system cools a flow of exhaust gas with a common coolant being used to cool an engine prior to mixing the flow of exhaust gas with a flow of intake air. The present exhaust gas recirculation system includes a control system for monitoring an operating parameter of an engine. The control system interprets a signal sensing the operating parameter within a controller and the controller causes an exhaust valve regulator to move between an open position and a closed position. Additionally, a plurality of paths or maps, for example, one being a normal coolant temperature strategy and another being a high coolant temperature strategy is used. In the normal coolant temperature strategy, with the exhaust valve regulator in the open position the supply of fuel to the engine would be advanced. And, in the high coolant temperature strategy, with the exhaust valve regulator in the closed position the supply of fuel to the engine would be retarded. Thus, the emissions emitted from the engine are maintained within a preestablished parameter.

43 Claims, 3 Drawing Sheets

22
12
14
30
20
40
36
10
32
16
34
18
50
36
38

EXHAUST GAS RECIRCULATION SYSTEM

Matter enclosed in heavy brackets [ ] appears in the original patent but forms no part of this reissue specification; matter printed in italics indicates the additions made by reissue.

TECHNICAL FIELD

This invention relates generally to as engines and more particularly to a reduction of exhaust emissions.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, the majority of the products of combustion have been controlled through design modifications and fuel selection. For example, at the present time smoke has normally been controlled by design modifications in the combustion chamber, particulates are normally controlled by traps and filters, and sulfur oxides are normally controlled by the selection of fuels being low in total sulfur. This leaves carbon monoxide, unburned hydrocarbons and nitrogen oxides as the emissions of primary concern in the exhaust gas being emitted from the engine.

Many systems have been developed for recycling a portion of the exhaust gas through the engine thereby reducing the emission of these components into the atmosphere. The recirculation of a portion of exhaust gas is used to reduce pollution emitted to the atmosphere. In many of such past system a volume of the exhaust gas from the engine was redirected to the intake air of the engine through the turbocharger and to the engine. It is anticipated that future exhaust emission standards will require the use of cooled exhaust gas recirculation to meet the emission standards. One method of cooling the exhaust gas is to use an engine jacket water cooler. The problem with this approach is that the temperature of the engine jacket water is increased and the heat must be rejected to the atmosphere via a heat exchanger or radiator. The tendency of vehicle manufactures is to reduce the frontal area of their vehicles to improve visibility and aerodynamics. Thus, with this tendency the available heat rejection area of the heat exchanger is being reduced and any increase in heat exchanger size requiring a larger frontal area is not well accepted. And, if the additional heat added to the engine cooling system by the exhaust gas cooling is not rejected, the extra heat will cause engine overheating under some operating parameters.

The present invention is directed to overcoming one or more of the problems as set forth above.

DISCLOSURE OF THE INVENTION

In one aspect of the invention an exhaust gas recirculation system is adapted for use with an engine. The engine has a cooling system defining a heat exchanger having a coolant flowing therethrough. The engine and the cooling system having a preestablished size and cooling rejection rate. The exhaust gas recirculation system is comprised at least a cylinder positioned within the engine. A piston positioned within the cylinder and defining a compression stroke. A flow of intake air enter the cylinder. A supply of combustible fuel enter the cylinder. A combustion process within the cylinder defines a flow of exhaust gas exiting therefrom. An exhaust valve regulator is interposed the flow of intake air and the flow of exhaust gas. The exhaust valve regulator is movable between an open position and a closed position. An exhaust gas cooler is positioned in the flow of exhaust gas being directed to the flow of intake air. The exhaust gas cooler has the coolant in the engine cooling the exhaust gas. And, a control system has a plurality of sensors being in communication with the engine. The sensors communicate a signal to a controller. The controller has a plurality of paths or maps defined therein and the controller interprets the signal and defines an operating parameter of the engine and controls the open position and the closed position of the exhaust valve regulator.

In another aspect of the invention, a method of reducing exhaust emissions from an engine defining a cylinder and having a piston positioned in the cylinder is comprised of the following steps. Passing a flow of exhaust gas through an exhaust gas cooler. Cooling the engine and the exhaust gas cooler with a coolant. The coolant being a common coolant. Circulating the coolant through a heat exchanger and cooling said engine. Passing the flow of exhaust gas after passing through the exhaust gas cooler to a flow of intake air. Passing the flow of intake air and the flow of exhaust gas after passing through the exhaust gas cooler to a cylinder. Supplying a quantity of combustible fuel to the cylinder in a preestablished relationship to a compression stroke of the piston. Monitoring an operating parameter of the engine and controlling the quantity of flow of exhaust gas to the flow of intake air depending on the operating parameter. And, combusting the flow of intake air and the flow of exhaust gas within the cylinder.

BEST MODE FOR CARRYING OUT THE INVENTION

Figure 1:
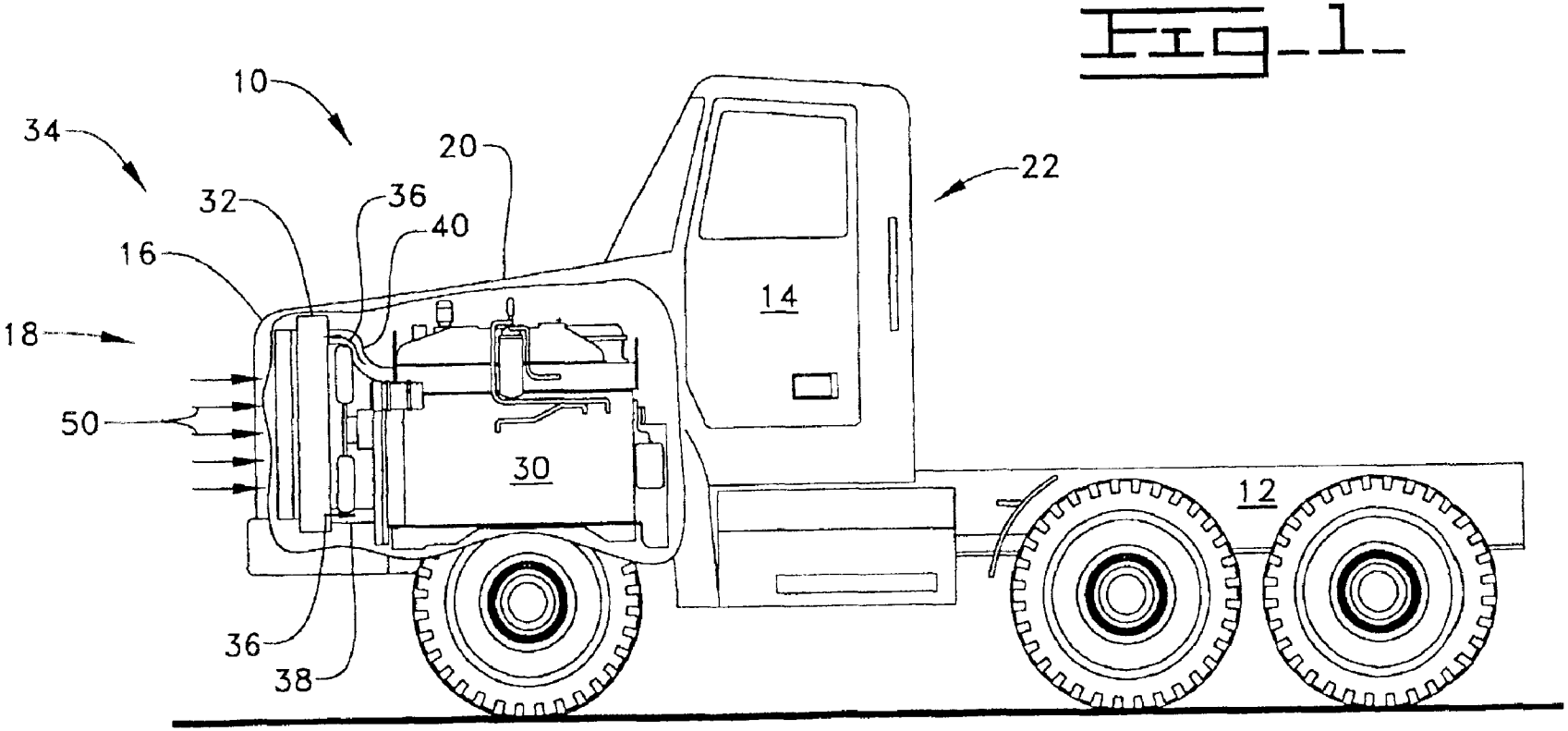
FIG. 1 is a schematically illustrated side view of a vehicle and an engine embodying the exhaust gas recirculation system.

Referring to FIG. 1, a vehicle 10, which is this application is an on highway truck, includes a frame 12 having a cab 14 mounted thereon. The cab 14 defines a front portion 16 having a preestablished frontal area 18. A hood portion 20 is positioned between the frontal area 18 and an operators station 22. An engine 30 is attached to the frame 12 and is positioned between the frontal area 18 and the operators station 22. A heat exchanger 32 is interposed the engine 30 and the frontal area 18. A cooling system 34 of conventional construction communicates a coolant, indicated by arrows 36, between the heat exchanger 32 and the engine 30. The cooling system 34 has a preestablished size and cooling rejection rate. For example, coolant 36 enters the engine 30 through a lower hose 38, is circulated through the engine 30 by a coolant pump, not shown, in a conventional manner and exits the engine 30 through an upper hose 40 to the heat exchanger 32. The heat exchanger 32 has a preestablished size which has a preestablished size relationship to the frontal area 18 and establishes a preestablished rate of heat rejection. Atmospheric air, indicated by an arrow 50, passes through the frontal area 18 and into the heat exchanger 32 to cool the coolant 36 in a conventional manner. The rate or quantity of air 50 and the temperature of the air passing through the preestablishedly sized heat exchanger 32 determines a rate of thermal heat rejection. The greater the quantity of the air 50 and the lower the temperature of the air 50 passing through the heat exchanger 32 the greater the rate of thermal heat rejection. Alternatively, the smaller the quantity of the air 50 and the higher the temperature of the air 50 passing through the heat exchanger 32 the lower the rate of thermal heat rejection. Furthermore, if the quantity of air remains constant and the temperature of the air is high, the rate of thermal heat rejection will be low.

Figure 2:
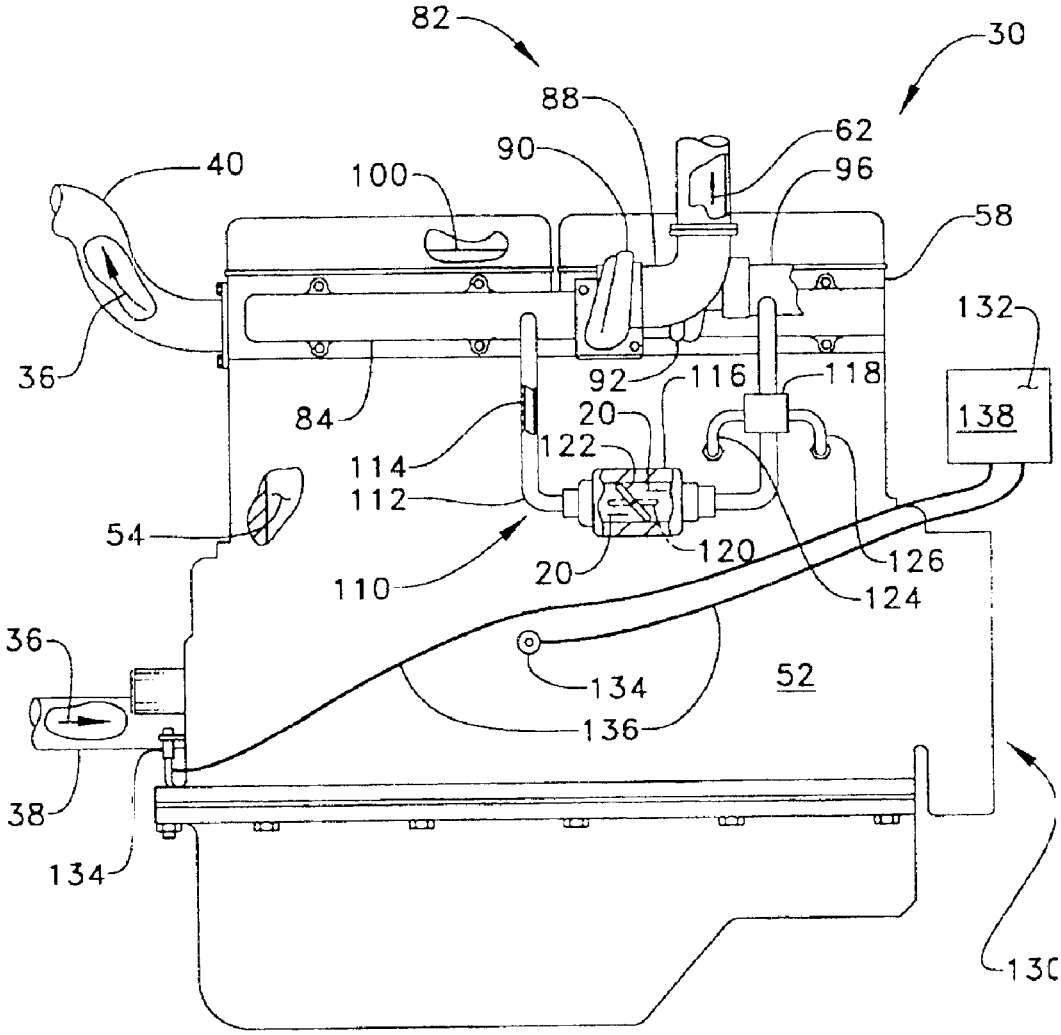
FIG. 2 is a partially cross-sectional view of the engine embodying the exhaust gas recirculation system.
Figure 3:
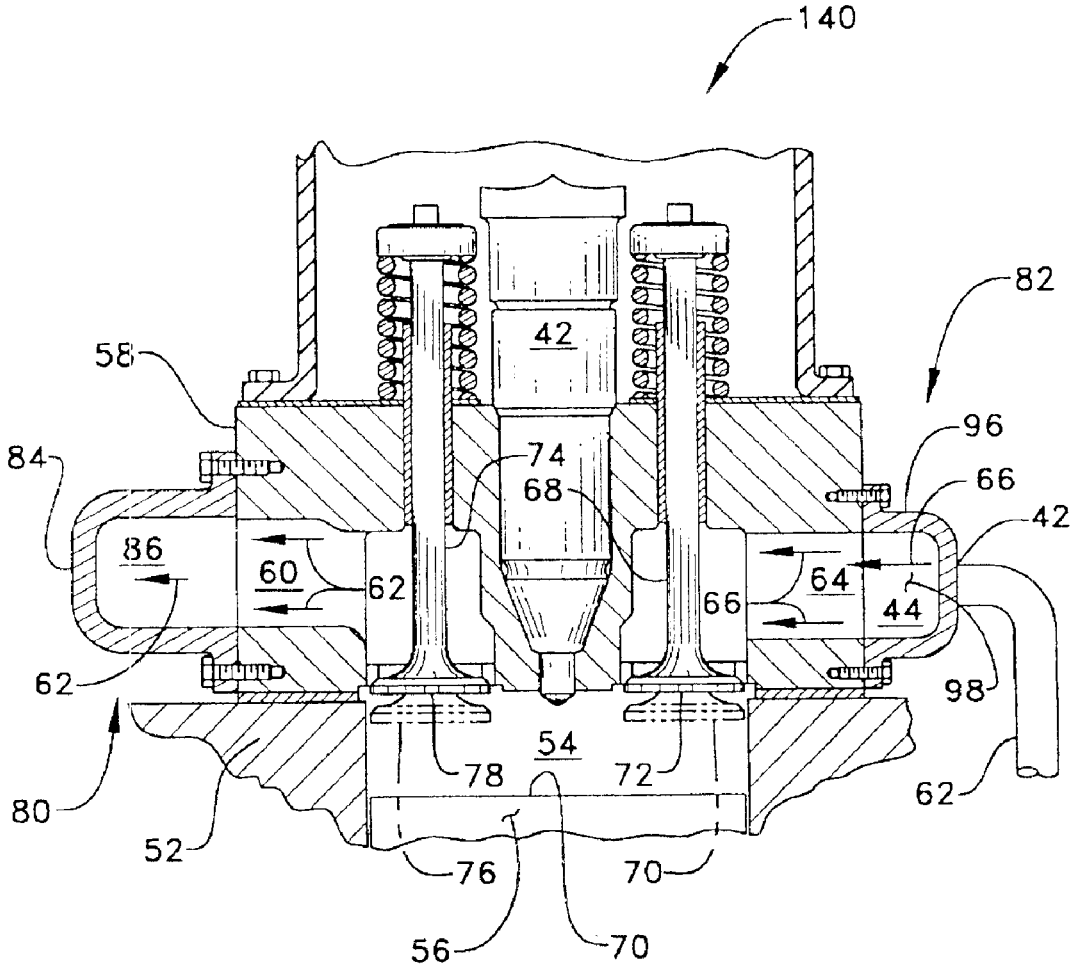
FIG. 3 is a cross-sectional view of a portion of the engine.

As best shown in FIGS. 2 and 3, the engine 30 includes a block 52 having a plurality of cylinder 54 therein, of which only one is shown. A piston 56 is movably positioned in each of the plurality of cylinders 54 in a conventional manner well known in the art. In this application, the engine 30 uses a conventional four stroke cycle. For example, the piston 56 is movable between an intake stroke, a compression stroke, a power stroke and an exhaust stroke, not shown. A head 58 is attached to the block 52. The head 58 includes an exhaust passage 60, having a flow of exhaust gas designated by the arrows 62 therein, and an intake passage 64, having a flow of intake air designated by the arrows 66 therein. An intake valve 68, or in this application a pair of intake valve, are interposed the intake passage 64 and the respective one of the plurality of cylinders 54 and operatively moves between an open position 70, shown in phantom, and a closed position 72. An exhaust valve 74 or in this application a pair of exhaust valves, are interposed the exhaust passage 60 and the respective one of the plurality of cylinders 54 and operatively moves between an open position 76, shown in phantom and a closed position 78. An exhaust system 80 and an intake system 82 are removably attached to the engine 30 respectively.

The exhaust system 80, in this application, includes an exhaust manifold 84 defining an exhaust passage 86 therein being in communication with the exhaust passage 60 within the head 58. A turbocharger 88 is attached to the exhaust manifold 84 in a conventional manner and has a turbine section 90 operative connected to and being driven by the flow of exhaust gas 62 from a combustion process within the plurality of cylinders 54. The turbocharger 88 further includes a compressor section 92 being driven by the turbine section 90 in a conventional manner. The flow of exhaust gas 62 exits an exhaust opening, not shown, in the turbine section 90 and passes to the atmosphere.

The intake system 82 includes an intake manifold 96 defining an intake passage 98 therein being in communication with the intake passage 64 within the bead 58. The compressor section 92 of the turbocharger 88 is operatively connected to the intake passage 98 in a conventional manner. The flow of intake air 66 is communicated from the atmosphere through a filter, not shown, to the compressor section 92 of the turbocharger 88 in a convention manner. The intake air 66 is communicated from the compressor section 92 through an aftercooler 100 which, in this application, is an air to air aftercooler located in the frontal area 18 and to the intake passage 98 within the intake manifold 96 in a conventional manner. And, in communicated into the intake passage 64 within the head 58 and to the plurality of cylinders 54.

An exhaust gas recirculation system 110 is operatively communicated between the flow of exhaust gas 62 and the flow of intake air 66. For example, in this application, a tube 112 having a passage 114 therein extends from the exhaust manifold 84 to the flow of intake air 66. An exhaust valve regulator 116 is positioned in the tube 112 and is interposed the exhaust manifold 84 and the flow of intake air 66. An exhaust gas cooler 118 is positioned in the tube 112 and is interposed the exhaust valve regulator 116 and the flow of intake air 66. The exhaust valve regulator 116 has an open position 120, shown in phantom, and a closed position 122. The exhaust valve regulator 116 is operatively movable through a infinite number of positions between the open position 120 and the closed position 122. With the exhaust valve regulator 116 at the open position 120, maximum exhaust gas 62 is recirculated to the plurality of cylinders 54. And, with the exhaust valve regulator 116 at the closed position 122 zero exhaust gas 62 is recirculated to the plurality of cylinders 54. At the positions therebetween, the amount of exhaust gas 62 recirculation is varied between maximum and zero recirculation. The exhaust gas cooler 118 has a coolant inlet line 124 communicating with the coolant 36 in the engine 30. And, a coolant outlet line 126 communicates with the coolant 36 in the engine 30. Each of the coolant inlet line 124 and the coolant outlet line 126 are connected to the engine block 52 and the exhaust gas cooler 118 in a conventional manner.

A control system 130 communicates between the engine 30 and the exhaust gas recirculation system 110. A plurality of paths or maps 132, depending on operating parameters of the engine 30 are used to control emissions and the resulting operating parameters of the engine 30. For example, the control system 130 includes a plurality of sensors 134 being positioned about the engine 30. The plurality of sensors 134 monitor engine 30 operating parameters. Such parameters include engine speed, coolant temperature, intake manifold pressure, exhaust manifold pressure and fuel quantity. Other parameters could include oil temperature, intake manifold temperature, ambient temperature and/or pressure. A plurality of communication means 136 such as wires or electronic devices are interposed the plurality of sensors 134 and a controller 138, such as a computer. The controller 138, as used with this application, is located onboard the vehicle 10 or engine 30. As an alternative, the controller 138 could be remotely positioned from the vehicle 10 or engine 30. The plurality of paths or maps 132 are stored within the controller 138. The plurality of paths or maps 132 are adjustable and can be changed or varied.

A conventional fuel injection system 140 is used with the engine 30. The fuel injection system 140 include a plurality of injectors 142, only one being shown, operative connected to respective ones of the plurality of cylinder 54. Each of the plurality of injectors 142 provides a flow of combustible fuel, not shown, to each of the plurality of cylinders 54. The quantity of fuel injected to each of the plurality of cylinders 54 is controllably injected between a low fuel quantity position and a high fuel quantity position, not shown. Thus, the quantity of fuel is variably controlled to each of the plurality of cylinders 54. Each of the plurality of fuel injectors 142, in this application, is electronically controlled by the controller 138. Other methods of controlling the plurality of fuel injectors could be used, for example, a mechanical system, a hydraulic system or a pneumatic system. Additionally, the controller 138, in this application, determines the relative timing (advance or retard) daring the operating parameters of the engine 30 in which fuel enters the respective one of the plurality of cylinders 54 and during the appropriate stroke's position.

INDUSTRIAL APPLICABILITY

In use, the engine 30 is started. Fuel is supplied to each of the plurality of cylinders 54 by the respective fuel injector 142 of the fuel system 140. Intake air 66 is supplied to the engine 30. For example, intake air 66 enters the compressor section 92 and is compressed. From the compressor section 92, intake air 66 passes through the aftercooler 100 and is cooled becoming more dense and enters into the intake passage 98 in the intake manifold 96. From the intake passage 98, as the intake valve 68 in moved into the open position 70 intake air 66 is drawn into the respective one of the plurality of cylinders 54. The intake air 66 and the fuel are combusted. After combustion, as the exhaust valve 74 is moved into the open position 76 the combusted fuel and intake air 66 form the flow of exhaust gas 62. The flow of exhaust gas 62 enters the exhaust passage 86 of the exhaust manifold 84 and passes to the atmosphere.

Under predetermined operating conditions of the engine 30, the exhaust gas recirculation system 110 is actuated. One such predetermined operating condition that would use the exhaust gas recirculation system 110 would be with high load conditions of the engine 30. This condition would provide maximum emissions reduction, specially NOx. For example, the controller 138 receives a signal from at least one of the plurality of sensors 134. The signal is interpreted by the controller 138 and directs a command to the exhaust valve regulator 116. The exhaust valve regulator 116 is moved in a conventional manner from the closed position 122 to the open position 120. Thus, a flow of exhaust gas 62 in allowed to flow through the exhaust valve regulator 116 and the exhaust gas cooler 118, and into and mixes with the flow of intake air 66. In the process of passing through the exhaust gas cooler 118, the flow of exhaust gas 66 is cooled. Additionally, as the hot exhaust gas 66 passes through the exhaust gas cooler 118, heat is absorbed by the engine coolant 36 passing therethrough. Thus, the engine coolant 36 temperature is increased.

Under certain operating parameters of the engine 30 and with the ambient temperature of the atmospheric air being high, 110 degrees Fahrenheit or higher, the heat added by the exhaust gas cooler 118 can cause the cooling system 34 to overheat. Thus, the mode of operation of the engine 30 must be altered to compensate for the overheating of the engine 30 cooling system 34. One option or alternative to solve the overheating problem is to have the plurality paths or maps 132 divided into at least two distinct exhaust emission parameters based on the engine 30 coolant 36 temperature. For example, one of the plurality of paths or maps 132 could be considered a normal coolant temperature strategy and would use a relatively high rate of exhaust gas 62 being mixed with the intake air 66 and the timing of the fuel injector 142 would be advanced to provide the operator with an improved fuel economy. And, another of the plurality of paths or maps 132 could be considered a high coolant 36 temperature strategy and would reduce the amount of exhaust gas 62 being mixed with the intake air 66 and the timing of the fuel injector would be retarded. During the high coolant 36 temperature strategy, fuel economy would be reduced. However, the heat rejection from the exhaust gas cooler 118 would be reduced preventing engine 30 overheating. The plus side to this strategy is that the vehicle cooling system 34, with the preestablished frontal area 18 can be sized in a conventional manner because the high coolant 36 temperature strategy results in a smaller engine beat rejection requirement. Additionally, the vehicle 10 and the engine 30 would run at the best fuel economy most of the time during the normal coolant temperature strategy.

With the present exhaust gas recirculation system 110 and with the control system 130 as defined above, the controller 138 receives a plurality of signals from individual ones of the plurality of sensors 134, interprets the signals and operates the exhaust gas recirculation system 110 depending on the appropriate one of the plurality of paths or maps 132. For example, as interpreted by the controller 138 the exhaust valve regulator 116 is moved between the open position 120 and the closed position 122 depending on the engine 10 operational parameter, path, map or condition. Thus, as the operating conditions of the engine 30 necessitate, the amount of exhaust gas recirculation or flow of exhaust gas 62 is varied and the emissions are controlled within a preestablished parameter. And, with the engine 30 coolant 36 temperature reaching the overheating temperature, the amount of exhaust gas recirculation or flow of exhaust gas 62 to the plurality of cylinders is reduced. This results in less heat rejection by the exhaust gas cooler 118. And, to compensate for the reduced flow of exhaust gas 62 to be mixed with the intake air 66, the timing of the fuel injector 142 is retarded. Thus, the emissions of the engine 30 are maintained within an acceptable level.

Other aspects, objects and advantages of this invention can be obtained from a sturdy of the drawings, the disclosure and the appended claims.

I claim:

1. An exhaust gas recirculation system being adapted for use with an engine, said engine having a cooling system defining a heat exchange having a coolant flowing therethrough said engine and said cooling system having a preestablished size and cooling rejection rate, said exhaust gas recirculation system comprising:

at least a cylinder being positioned within said engine a piston being positioned in said cylinder and defining a compression stroke;

a flow of intake air entering said cylinder;

a supply of combustible fuel entering said cylinder a combustion process within said cylinder defining a flow of exhaust gas exiting therefrom;

an exhaust valve regulator being interposed said flow of intake air and said flow of exhaust gas, said exhaust valve regulator being movable between an open position and a closed position;

an exhaust gas cooler being positioned in said flow of exhaust gas being directed to said flow of intake air and said exhaust gas cooler having said coolant in said engine cooling said exhaust gas; and a control system having a plurality of sensors being in communication with said engine and communicating a signal to a controller, said controller having a plurality of paths or maps defined therein and said controller interpreting said signal defining an operating parameter of said engine and controlling said open position and said closed position of said exhaust valve regulator, and one of said plurality of maps defining a normal coolant temperature strategy having said supply of combustible fuel entering said cylinder being advanced and said quantity of said flow of exhaust gas being directed to said flow of intake air being at a maximum, and another of said plurality of maps defining a high coolant temperature strategy having said supply of combustible fuel entering said cylinder being retarded and said quantity of said flow of exhaust gas being directed to said flow of intake air being at a minimum.

2. The exhaust gas recirculation system of claim 1 wherein said exhaust valve regulator being movable between said open position and said closed position through an infinite number of positions.

3. The exhaust gas recirculation system of claim 1 wherein said operating parameter being communicated to said controller is coolant temperature.

4. The exhaust gas recirculation system of claim 3 wherein said coolant temperature defines a normal coolant temperature strategy in which said flow of exhaust gas mixing with said intake air is defined as a high rate of exhaust gas.

5. The exhaust gas recirculation system of claim 4 wherein during said normal coolant temperature strategy said supply of combustible fuel entering said cylinder is advanced relative to said compression stroke.

6. The exhaust gas recirculation system of claim 3 wherein said coolant temperature defines a high coolant temperature strategy in which said flow of exhaust gas mixing with said intake air is defined as a low rate of exhaust gas.

7. The exhaust gas recirculation system of claim 6 wherein during said high coolant temperature strategy said supply of combustible fuel entering said cylinder is retarded relative to said compression stroke.

8. The exhaust gas recirculation system of claim 7 wherein said low rate of exhaust gas mixing with said intake air is zero.

9. The exhaust gas recirculation system of claim 1 wherein one of said operating parameters being communicated to said controller is an oil temperature.

10. The exhaust gas recirculation system of claim 1 wherein one of said operating parameters being communicated to said controller is an intake manifold temperature.

11. The exhaust gas recirculation system of claim 1 wherein one of said operating parameters being communicated to said controller is an ambient temperature.

12. The exhaust gas recirculation system of claim 11 wherein one of said operating parameters being communicated to said controller further includes an atmospheric pressure.

13. The exhaust gas recirculation system of claim 1 wherein said engine defining a plurality of operating modes and during at least one of said operating modes said rate of thermal heat rejection being exceeded.

14. The exhaust gas recirculation system of claim 13 wherein during said operating mode at which said rate of thermal heat rejection is exceeded, said supply of combustible fuel entering said cylinder is advanced.

15. The exhaust gas recirculation system of claim 14 wherein said quantity of said flow of exhaust gas being directed to said flow of intake air being at a maximum.

16. The exhaust gas recirculation system of claim 1 wherein said engine defining a plurality of operating modes and during at least a portion of said operating modes said rate of thermal heat is not exceeded and said supply of combustible fuel entering said cylinder being advanced.

17. The exhaust gas recirculation system of claim 16 wherein said quantity of said flow of exhaust gas being directed to said flow of intake air being at a maximum.

18. A method of reducing exhaust emissions from an engine defining a cylinder and having a piston positioned in said cylinder, said method comprising the steps of:

passing a flow of exhaust gas through an exhaust gas cooler, cooling said engine and said exhaust gas cooler with a coolant, said coolant being a common coolant circulating said coolant through a heat exchanger and cooling said engine;

passing said flow of exhaust gas after passing through said exhaust gas cooler to a flow of intake air;

passing said flow of intake air and said flow of exhaust gas after passing through said exhaust gas cooler to a cylinder;

supplying a quantity of combustible fuel to said cylinder in a preestablished relationship to a compression stroke of said piston;

monitoring an operating parameter of said engine, said operating parameter of said engine defining a plurality of maps and one of said plurality of maps defining a normal coolant temperature strategy having said supply of combustible fuel entering said cylinder being advanced and said quantity of said flow of exhaust gas being directed to said flow of intake air being at a maximum, and controlling the quantity of flow of exhaust gas to said flow of intake air depending on the operating parameter, and another of said plurality of maps defining a high coolant temperature strategy having said supply of combustible fuel entering said cylinder being retarded and said quantity of said flow of exhaust gas being directed to said flow of intake air being at a minimum; and combusting said flow of intake air and said flow of exhaust gas within said cylinder.

19. The method of reducing exhaust emissions of claim 18 wherein said step of monitoring an operating parameter being monitoring a temperature of said coolant.

20. The method of reducing exhaust emissions of claim 18 wherein said step of monitoring an operating parameter being monitoring a temperature of an oil.

21. The method of reducing exhaust emissions of claim 18 wherein said step of monitoring an operating parameter being monitoring a temperature of an intake manifold.

22. The method of reducing exhaust emissions of claim 18 wherein said step of monitoring an operating parameter being monitoring an ambient temperature.

23. The method of reducing exhaust emissions of claim 22 wherein said stem of monitoring an operating parameter further includes monitoring an atmospheric pressure.

24. The method of reducing exhaust emissions of claim 18 wherein said step of passing said flow of exhaust gas through said exhaust gas cooler said control system operatively controlling a position of an exhaust valve regulator between an open position and a closed position defining a quantity of said flow of exhaust gas.

25. The method of reducing exhaust emissions of claim 24 wherein said operatively controlling said position of said exhaust valve regulator between said open position and said closed position includes sensing said operating parameter of said engine and sending a signal representing said operating parameter to a controller, said controller interpreting said signal and moving said exhaust valve regulator between said open position and said closed position.

26. The method of reducing exhaust emissions of claim 18 wherein said step of passing said flow of exhaust gas through an exhaust gas cooler includes having an exhaust valve regulator operatively controlling said flow of exhaust gas.

27. The method of reducing exhaust emissions of claim 26 wherein said exhaust valve regulator being movable between an open position having a flow exhaust gas passing therethrough and a closed position preventing a flow of exhaust gas therethrough, and said step of supplying a quantity of combustible fuel to said cylinder passing with said exhaust valve regulator being in said open position being supplied at an advanced position.

28. The method of reducing exhaust emissions of claim 26 wherein said exhaust valve regulator being movable between an open position having a flow exhaust gas passing therethrough and a closed position preventing a flow of exhaust gas therethrough, and said step of supplying a quantity of combustible fuel to said cylinder passing with said exhaust valve regulator being in said closed position being supplied at a retarded position.

*29. A method of reducing exhaust emissions from an engine comprising:*

*diverting a quantity of engine exhaust gas to an intake passage of the engine;*

*cooling the diverted engine exhaust gas as the engine exhaust gas flows through an exhaust gas cooler;*

*circulating coolant through the exhaust gas cooler;*

*circulating said coolant through a heat exchanger and cooling said engine;*

*monitoring an engine parameter indicative of a temperature of the engine; and*

*controlling the quantity of engine exhaust gas diverted to the intake passage of the engine based on the monitored engine parameter,*

*said controlling including, when the engine parameter indicates that the temperature of the engine is above a threshold value, substantially discontinuing said quantity of exhaust gas diverted to the intake passage and retarding a supply of combustible fuel entering a cylinder of the engine, and*

*said controlling including, when the engine parameter indicates that the temperature of the engine is below the threshold value allowing a maximum quantity of exhaust gas to be diverted to the intake passage and the supply of combustible fuel entering the cylinder advanced relative to the supply when the engine parameter indicates that the temperature of the engine is above the threshold value.*

*30. The method of claim 29, wherein the threshold value corresponds to an engine overheated temperature.*

*31. The method of claim 29, wherein the engine parameter is engine coolant temperature.*

*32. The method of claim 29, wherein said substantially discontinuing the quantity of exhaust gas diverted includes moving an exhaust valve regulator to a closed position.*

*33. The method of claim 29, wherein said controlling of the quantity of engine exhaust includes using a plurality of maps.*

*34. An exhaust gas recirculation system being adapted for use with an engine, said engine having a cooling system defining a heat exchanger having a coolant flowing therethrough said engine and said cooling system having a preestablished size and cooling rejection rate, said exhaust as recirculation system comprising:*

*at least a cylinder being positioned within said engine;*

*a piston being positioned in said cylinder and defining a compression stroke;*

*a flow of intake air entering said cylinder;*

*a supply of combustible fuel entering said cylinder;*

*a combustion process within said cylinder defining a flow of exhaust gas exiting therefrom;*

*an exhaust valve regulator being interposed said flow of intake air and said flow of exhaust gas, said exhaust valve regulator being movable between an open position and a closed position;*

*an exhaust gas cooler being positioned in said flow of exhaust gas being, directed to said flow of intake air; and*

*a control system having a plurality of maps and sensors being in communication with said engine and communicating a signal to a controller,*

*said controller interpreting a said signal defining an operating parameter corresponding to a temperature of said engine and controlling the position of said exhaust valve regulator in response thereto so that when the operating parameter is above a threshold value, the exhaust valve regulator is maintained closed, and*

*said controller also adjusting the timing of the supply of combustible fuel entering said cylinder in relation with said controlling of the position of the exhaust valve regulator so that when the exhaust valve regulator is closed the supply of combustible fuel entering said cylinder is retarded with respect to the supply of combustible fuel when the exhaust valve regulator is open.*

*35. The exhaust gas recirculation system of claim 34 wherein said exhaust valve regulator being movable between said open position and said closed position through an infinite number of positions.*

*36. The exhaust gas recirculation system of claim 34 wherein said operating parameter is coolant temperature.*

*37. The exhaust gas recirculation system of claim 34 wherein said operating parameter is an oil temperature.*

*38. The exhaust gas recirculation system of claim 34 wherein said operating parameter is an intake manifold temperature.*

*39. A method of reducing exhaust emissions from an engine defining a cylinder and having a piston positioned in said cylinder, said method comprising the steps of:*

*passing a flow of exhaust gas through and exhaust valve regulator and an exhaust gas cooler;*

*circulating a coolant through a heat exchanger and cooling said engine;*

*passing said flow of exhaust gas after passing through said exhaust gas cooler to a flow of intake air;*

*passing said flow of intake air and said flow of exhaust gas after passing through said exhaust gas cooler to a cylinder;*

*supplying a quantity of combustible fuel to said cylinder in a relationship to a compression stroke of said piston;*

*monitoring, an operating parameter corresponding to a temperature of the engine*

*adjusting the quantity of flow of exhaust gas being directed to said flow of intake air in response to the monitored operating parameter so that when the operating parameter is above a threshold value, the exhaust valve regulator is maintained closed*

*adjusting the timing of the supplying of combustible fuel entering the cylinder in a relationship to said adjusting of the quantity of flow exhaust being directed to the flow of intake air so that when the exhaust valve regulator is closed, the supply of combustible fuel entering said cylinder is retarded relative to a supply of combustible fuel when the exhaust valve regulator is open; and*

*combusting said flow of intake air and said flow of exhaust gas within said cylinder.*

*40. The method of reducing exhaust emissions of claim 39 wherein said monitoring an operating parameter includes monitoring a temperature of said coolant.*

*41. The method of reducing exhaust emissions of claim 39 wherein said monitoring an operating parameter includes monitoring a temperature of an oil.*

*42. The method of reducing exhaust emissions of claim 39 wherein said monitoring an operating parameter includes monitoring a temperature of an intake manifold.*

*43. The method of reducing exhaust emissions of claim 39 wherein said monitoring an operating parameter includes monitoring an ambient temperature and an atmospheric pressure.*

* * * * *

UNITED STATES PATENT AND TRADEMARK OFFICE

CERTIFICATE OF CORRECTION

PATENT NO. : RE 39,937 E
APPLICATION NO. : 10/180458
DATED : December 11, 2007
INVENTOR(S) : Coleman It is certified that error appears in the above-identified patent and that said Letters Patent is hereby corrected as shown below:

Please correct the Specification as follows:
Column 1, line 10, delete “as” and insert -- an --.

Column 3, line 51, delete “bead 58” and insert -- head 58 --.

Column 3, line 61, after “And,” delete “in” and insert -- is --.

Column 4, line 60, delete “daring” and insert -- during --.

Column 5, line 7, after “68” delete “in” and insert -- is --.

Column 5, line 27, delete “in” and insert -- is --.

Column 5, line 42, after “plurality” insert -- of --.

Column 5, line 62, delete “beat” and insert -- heat --.

Please correct the Claims as follows:
Column 6, line 29, in claim 1, after “engine” insert -- ; --.

Column 6, line 33, in claim 1, after “cylinder” insert -- ; --.

Column 7, line 58, in claim 18, delete “cooler,” and insert -- cooler; --.

Column 7, line 60, in claim 18, delete “coolant” and insert -- coolant; --.

Column 9, line 26, in claim 29, delete “value” and insert -- value, --.

Column 9, line 47, in claim 34, delete “as” and insert -- gas --.

Column 9, line 61, in claim 34, delete “being,” and insert -- being --.

Column 10, line 9, in claim 34, delete “closed” and insert -- closed, --.

Column 10, line 38, in claim 39, delete “monitoring,” and insert -- monitoring --.

UNITED STATES PATENT AND TRADEMARK OFFICE

CERTIFICATE OF CORRECTION

PATENT NO. : RE 39,937 E
APPLICATION NO. : 10/180458
DATED : December 11, 2007
INVENTOR(S) : Coleman It is certified that error appears in the above-identified patent and that said Letters Patent is hereby corrected as shown below:

Column 10, line 44, in claim 39, delete “closed” and insert -- closed; --.

Signed and Sealed this

Fourth Day of November, 2008

JON W. DUDAS
*Director of the United States Patent and Trademark Office*